United States Patent [19]
Foster

[11] 3,769,807
[45] Nov. 6, 1973

[54] CARCASS CHILLING FACILITY
[75] Inventor: Fred M. Foster, Anaheim, Calif.
[73] Assignee: Airco, Inc., New York, N.Y.
[22] Filed: Aug. 9, 1971
[21] Appl. No.: 170,158

[52] U.S. Cl. .................................. 62/63, 62/380
[51] Int. Cl. .................................. F25d 13/06
[58] Field of Search .................... 62/63, 64, 380; 99/197, 198; 198/177

[56] References Cited
UNITED STATES PATENTS

| | | | |
|---|---|---|---|
| 1,948,790 | 2/1934 | Grayson | 62/380 X |
| 1,955,669 | 4/1934 | Botz | 62/380 |
| 2,974,497 | 3/1961 | Carpenter et al. | 62/63 |
| 3,269,142 | 8/1966 | Mola et al. | 62/381 |
| 3,316,726 | 5/1967 | Pauliukonis | 62/514 X |
| 3,464,229 | 9/1969 | Riley | 62/381 |
| 3,708,995 | 1/1973 | Berg | 62/63 |
| 3,380,113 | 4/1968 | Zebarth et al. | 17/11 |

OTHER PUBLICATIONS
Kenneth A. Merz, "Transverse-Flow Fans," Product Engineering, April 1, 1963, pps. 51–55.

Primary Examiner—Meyer Perlin
Assistant Examiner—Ronald C. Capossela
Attorney—Edmund W. Bopp

[57] ABSTRACT

Apparatus for chilling animal carcasses, including an insulated enclosure having a baffled entrance and exit, and means to inject carbon dioxide refrigerant into the enclosure. A continuous variable speed conveyor is mounted in the enclosure for transporting the carcasses therethrough. The conveyor is arranged in serpentine fashion to define a plurality of parallel, closely spaced, inter-connected flights within the enclosure. Elongated line-flow fan means are positioned to establish a recirculating flow of carbon dioxide vapor across the closely spaced flights. An adjustable temperature controller in conjunction with a temperature sensor controls temperature in the enclosure by means of signals to the carbon dioxide injecting apparatus.

8 Claims, 2 Drawing Figures

INVENTOR
FRED M. FOSTER
BY *F B Henry*
ATTORNEY

CARCASS CHILLING FACILITY

BACKGROUND OF INVENTION

This invention relates generally to refrigeration of perishable products, and more specifically relates to apparatus useful in chilling of recently slaughtered animal carcasses.

In the meat packing, poultry dressing and related food and agricultural industries, it is common practice to direct a freshly killed animal carcass through a chilling facility, the object of which is to reduce the carcass temperature from its fresh-killed temperature of about 100°F to a safe temperature of the order of 35°–40°F, whereat the threat of product deterioration is sharply reduced. The chilled product may then be subjected to further processing, e.g. sectioning, cutting, freezing, or so forth.

In order to reduce deterioration in the quality of the meat product, it is most desirable to accomplish the aforementioned chilling operation in as rapid time as possible. It is also important from an economic viewpoint to effect such chilling under conditions such that the loss of moisture from the meat being chilled is minimized. The seriousness of the latter problem becomes evident when it is appreciated that in many conventional cooling arrangements weight loss due to dehydration can amount to some 2–2 ½ percent of the original carcass weight.

In recent years it has been found that a superior instrumentality for alleviating the aforementioned problems is a chilling system based upon use of a carbon dioxide refrigerating atmosphere. The very low temperatures attainable in such an atmosphere are able in principle to chill the carcasses with relative rapidity, moisture control problems are largely obviated by the dry nature of the process, and weight loss by evaporation is reduced by the limited time duration of the process and by the very cold ambient temperatures.

Notwithstanding the foregoing, presently utilized carbon dioxide refrigerant-based chilling facilities have remained less than ideal with respect to the most important criterion, that of effecting rapid and at the same time uniform chilling of carcasses thereby processed. A principal problem in this respect has been that of providing sufficient cooling to all portions of the carcass to yield the desired effect without introducing undue complexity or cost into mechanisms for manipulating the carcass or gas flow, and also without detrimentally affecting the space available for processing.

In accordance with the foregoing, it may be regarded as an object of the present invention to provide a carcass chilling facility which enables very rapid and uniform chilling of products thereby processed.

It is a further object of the invention to provide a carcass chilling facility, which enables rapid and expeditious chilling on a conveyor line of carcasses presented thereto and which, furthermore, is compact and capable of processing large quantities of products per unit time in relationship to the size of such facility.

It is another object of the invention to provide a carcass chilling facility wherein gas circulation and carcass movement are made to so interact that excellent exposure of all areas of the carcass to refrigerant is achieved.

SUMMARY OF INVENTION

Now, in accordance with the present invention, the foregoing objects and others will become apparent in the course of the ensuing specification, are achieved in a facility including an insulated enclosure having baffled entrance and exit, and means to inject carbon dioxide refrigerant into the enclosure. A continuous variable speed conveyor is mounted in the enclosure for transporting the carcasses therethrough. The conveyor is arranged in serpentine fashion to define a plurality of parallel, closely spaced, interconnected flights within the enclosure, whereby carcasses transported through the said enclosure are not only subjected to reorientation as they proceed to successive flights, but by virtue of the flight arrangement are passed through virtually all portions of the enclosed chilling volume. Elongated line-flow fan means are positioned to establish an efficient recirculating flow of carbon dioxide vapor in a direction either transverse or parallel to the flights. Temperature within the enclosure may be controlled by a temperature sensor which, as appropriate, signals the carbon dioxide injecting means to feed in additional refrigerant.

BRIEF DESCRIPTION OF DRAWINGS

The invention is diagrammatically illustrated, by way of example in the drawings appended hereto, in which.

DESCRIPTION OF PREFERRED EMBODIMENT

Figure 1:
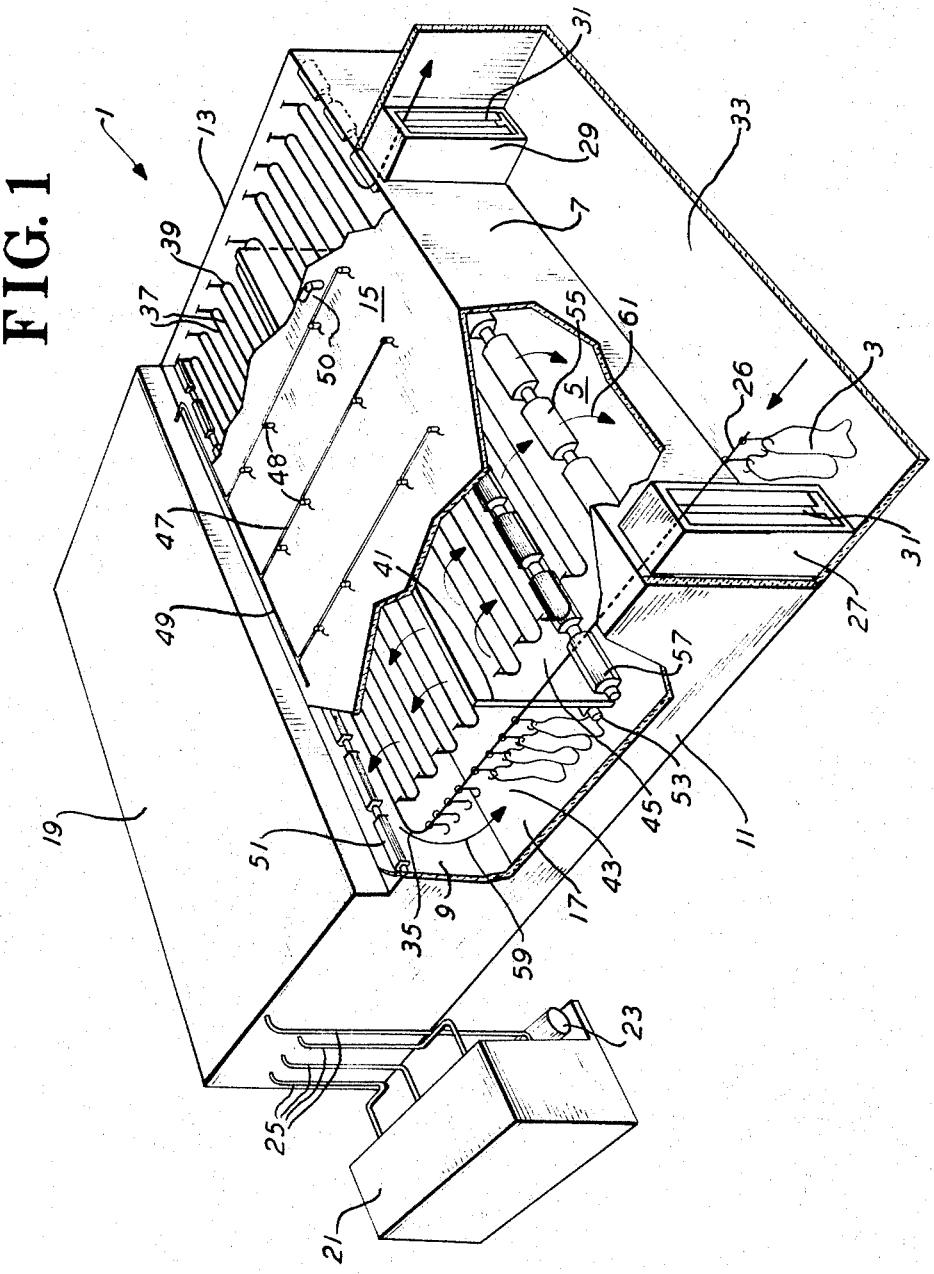
FIG. 1 is an isometric, partially broken-away view of a carcass chilling facility in accordance with the present invention.

In FIG. 1, a chilling facility generally designated at 1 is set forth. Actual chilling of animal carcasses 3 treated by facility 1 occurs within the enclosed chilling chamber 5, which is bounded by front and rear walls 7 and 9, by side walls 11, 13, by ceiling 15 and by floor 17. Each of the said enclosing members is preferably constructed of thick (e.g. 6 in.) closed cell polyurethane with steel exterior and interior skin, whereby chamber 5 is highly insulated against heat flow. The section 19 of facility 1 to the rear of chamber 5 houses process heat exchangers, a carbon dioxide liquid tank, baseload compressor, a recovery unit and a secondary fluid compressor, all of said items being instrumental in supply and recirculation of carbon dioxide refrigerant to and from chamber 5. Also seen in the Figure, to the left of section 19 is a cooling tower 21, water circulating pumps 23 and the associated tubing 25 passing coolant water into and out of section 19 for interaction at the process heat exchanger housed therein. The details of section 19 need not be shown since they form no part of the present invention. Refrigerant vapor may be returned to section 19 for cleanup and reliquefaction in a conduit 50, which is shown in part. If necessary a blower may be placed in this line to assist flow.

In accordance with the present invention, carcasses 3 proceeding from the kill floor via an overheat conveyor 26, enter chamber 5 by an entrance 27 and after passing completely through chamber 5, leave via an exit 29. Both entrance 27 and exit 29 are baffled, as by movable louvers 31, whereby to isolate the environment of chamber 5 from that of anteroom 33.

Upon a carcass 3 entering chamber 5, it will be seen that the product proceeds along the conveyor 26 to a point 35 adjacent rear wall 9. The conveyor 26 is of generally conventional construction and is preferably driven by a variable speed motor whereby the time of transit through chamber 5 may be selectively adjusted. At point 35 the conveyor track turns to define a direction parallel to wall 9 and the track now is arranged in serpentine fashion so as to define a series of closely spaced parallel flights 37 running back and forth between side walls 11 and 13 of the chamber. Since such flights 37 are, of course, only part of the continuous conveyor 26 it will be evident that the carcasses conveyed along such flights will actually be carried to and fro across the chamber 5 and rotated about 180° at the turning sections 39 connecting successive flights. The snaking back and forth of the conveyor track along generally parallel flight lines thus defines a plurality of compactly positioned, elongated loops that are efficiently related to the chilling process as described below.

Chilling chamber 5 is actually seen to be subdivided by a wall 41 parallel to flights 37 into two sub-chambers 43 and 45. These sub-chambers are not truly separate in that the wall 41, while extending from ceiling 15 to floor 17, does not extend fully across chamber 5; on the contrary it is clear that conveyor 26 passes to the left side of one edge of wall 41 and it is seen that at point 43, to the right of wall 41, the conveyor track passes carcasses from sub-chamber 43 into sub-chamber 45.

The principal purpose in this sub-dividing the chilling chamber 5 is to increase the effectiveness of the gas circulation scheme now to be set forth. Firstly in this connection it will be noted that liquid carbon dioxide refrigerant for effecting chilling operations within chamber 5 is brought into the chamber by the tree-like injection means 47 from the storage tank in 19 via feeder line 49. The supply of liquid is controlled by solenoid valves 48 and is sprayed into the chamber through nozzles. As has previously been indicated the use of a carbon dioxide refrigerant for chilling purposes is per se well-known and details of the injection apparatus are not set forth. An adjustable temperature sensor such as a thermocouple-type thermostat is positioned within chamber 5 and an output therefrom utilized to control the solenoid valves and the injection of liquid carbon dioxide from means 47 into chamber 5 to maintain a desired temperature (such as −80°F) of the chamber atmosphere. The set temperature may be adjusted to give optimum chilling economics.

In accordance with the invention it is seen that in subchamber 43, a pair of extended line-flow fan means 51, 53 are present at respectively the intersection of rear wall 9 with ceiling 15, and at the intersection of wall 41 with floor 17. Similarly, with respect to sub-chamber 45, an identical pair of extended line-flow fan means 55, 57 are present at, respectively, the intersection of front wall 7 with ceiling 15 and at the intersection of the adjacent side of wall 41 with floor 17.

The extended line-flow fan means 51, 53, 55, 57 which are utilized in the present invention are useful in providing a smooth uniform curtain of discharged gas at the orifices thereof. Such fan means, which are sometimes identified under the designation "transverse-flow" fans, are more fully described in many places of the literature. Reference may be had, for example, to the article entitled "Transverse-Flow Fan", appearing in Product Engineering for Apr. 1, 1963, for a detailed description of these devices. In the environment of sub-chambers 43 and 45, the horizontal positioning of such means at opposite edges of the sub-chambers is effective to establish circulating air curtains as suggested by the arrows 59 in sub-chambers 43 and by the arrows 61 in sub-chambers 45. The respective air circulations at 59 and 61 are clearly in opposite directions with respect to one another; the most important consideration being, however, that by means of the said pairs of oppositely disposed line-flow fan means an exceedingly efficient curtain-like flow of refrigerant is established across the flights 37. It is this highly efficient gas flow pattern, which is seen to be one wherein the flow lines proceed in planes which are generally vertical, which combines with the movement of carcasses back and forth through virtually all volumes of chamber 5 which results in the outstandingly rapid chilling, which is enabled by the present apparatus. The line-flow fans also extend across substantially the entire width of the chamber thereby eliminating dead spots. Since as previously stated, each carcass is rotated 180° during transportation through each loop, the carcasses are alternately traversed at opposite sides by flow of refrigerant as they proceed along the conveyor track, thereby ensuring more uniform chilling.

Figure 2:
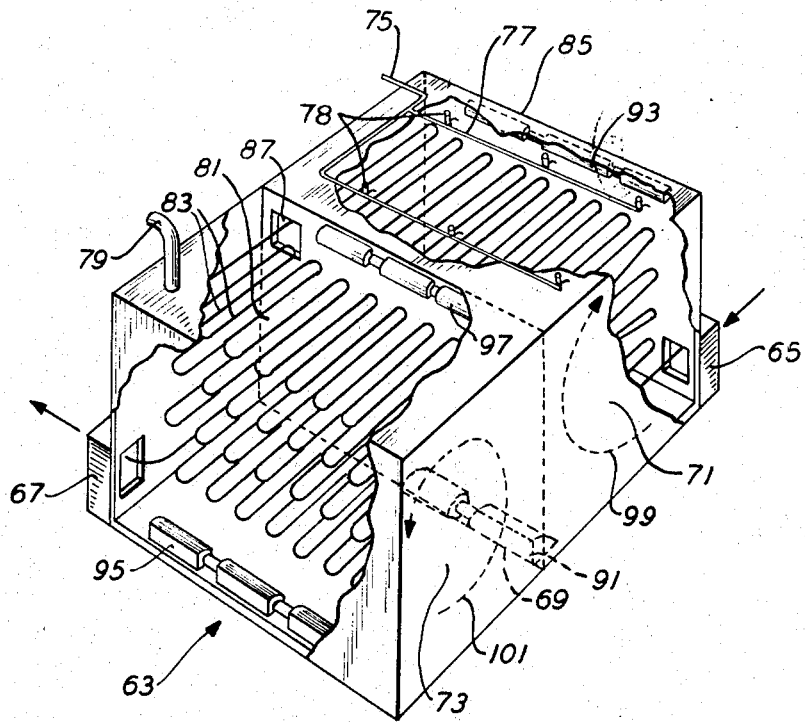
FIG. 2 is an isometric, partially broken-away view of a further embodiment of the invention, the chilling facility therein depicted being partially suited to poultry processing.

In FIG. 2, a further embodiment of the invention is set forth, such embodiment being particularly suited to chilling of poultry carcasses such as chickens. In FIG. 2 only the chilling chamber 63 itself appears. The remaining conventional carbon dioxide source and processing apparatus, although being incorporated into the overall facility, are in the interests of simplicity, not shown. Chamber 63, like chamber 5 of FIG. 1, is constructed of a steel-skinned thick polyurethane insulation. An entrance port (preferably baffled) is provided at 65 for fresh-killed poultry entering from the kill floor of a poultry processing and packing facility; the carcasses, after proceeding through the entire volume of chamber 63 leave such chamber via a baffled exit 67. Chamber 63 is provided with a dividing wall 69 extending through the mid-plane thereof and thereby defining two sub-chambers 71 and 73. Liquid carbon dioxide brought in via a feed line 75 and tree-like injector means 77 is sprayed into sub-chamber 71 through spray nozzles under the control of solenoid control valves 78. The carbon dioxide refrigerant is recovered by a pipe 79 at the ceiling of sub-chamber 73. Carbon dioxide refrigerant need not be supplied directly to sub-chamber 73 in that sufficient chilling occurs with the arrangement shown for the poultry carcasses to, upon leaving exit 67, be fed directly to hard freezing units (not shown). As was described in connection with FIG. 1, thermostat means are preferably provided with sensors in sub-chambers 71 and/or 73 for controlling the solenoid valves to inject quantities of refrigerant to maintain the temperatures in chambers 63 at a selected level.

In accordance with the embodiment of the invention appearing in FIG. 2, the track 81 which defines the path of the conveyor utilized to carry poultry through chamber 63 is seen to be arranged in serpentine fashion so as to define both in sub-chambers 71 and 73 a series of closely spaced parallel flights 83. It will be noted further, however, that track 81 in sub-chamber 71 not only snakes back and forth between walls 85 and 69 but moreover displays a gradual vertical rise so that a conveyed carcass rises vertically as it traverses the volume of sub-chamber 71 and thus finally exits at interconnecting passage 87 to sub-chamber 73. In the latter sub-chamber, it is conversely seen that the conveyor track 81 now snakes back and forth between walls 69 and 89 also along generally horizontal lines and at the same time gradually descends so that upon a carcass passing through exit 67, it has returned to the vertical level whereat it entered at port 65. The snaking back and forth of track 81 takes place at a plurality of levels in both sub-chambers whereby a plurality of overlying tiers such as 66, 68, etc. are present at each sub-chamber. It will be appreciated that the net effect of the arrangement within chamber 63 is to cause a traversing poultry carcass to not only be changed 180° in orientation upon passing to each successive flight but to moreover successively pass through portion upon portion of the volumes of sub-chambers 71 and 73 so that effects of localized temperature variations within the said sub-chambers are largely nullified.

In a similar manner as has been described in connection with FIG. 1, it is seen that each of the sub-chambers 71, 73 are provided with a pair of extended linear flow fan means 91, 93 and 95, 97, each member of such pair being disposed along a line at respectively opposite edges of the particular sub-chamber. The curtain-like flow of carbon dioxide gas in the two sub-chambers is suggested by arrows 99 and 101. The two flow patterns differ from that described in connection with FIG. 1 to the extent that the flow in FIG. 2 is in a direction generally parallel to the flights 83 as opposed to the arrangement of FIG. 1 where such flow is substantially transverse to the said flights.

The line-flow fans shown in FIG. 2 extend across substantially the width of the chambers and thus serve to eliminate dead spots. Although it is preferred to use pairs of line-flow fans as illustrated, a single row of fans could be used in each chamber. The characteristics of these fans lend themselves admirably to the even distribution of carbon dioxide refrigerant vapor in a chilling environment. The fans draw in vapor in a radial sense and discharge it in a radial sense from a different portion of the fan periphery. Thus circulation in the direction shown by the arrows may be achieved. By using pairs of line-flow blowers the circulation is further enhanced. It is also within the scope of this invention to use such blowers in three or four corners of the same chamber. The line-flow blowers have another advantage in that they may readily be placed in the corners of the chamber and thereby conserve space. This conservation of space increases the capacity of the chamber thereby permitting more material to be chilled. The fans are conveniently motor driven and the drives may be located within the chamber or exteriorily thereof to avoid the low chamber temperatures.

While the present invention has been particularly described in terms of specific embodiments thereof, it will be understood, in view of the instant disclosure, that numerous variations upon the invention are now enabled to those skilled in the art which variations, in propriety, yet reside within the scope of the instant teaching. Accordingly the invention is to be broadly construed and limited only by the scope and spirit of the claims now appended hereto.

I claim:

1. Apparatus for chilling animal carcasses, comprising in combination:
    a. an insulated enclosure;
    b. entrance and exit means to and from said enclosure;
    c. means to inject carbon dioxide refrigerant into said enclosure to maintain the enclosure atmosphere at a desired temperature;
    d. conveyor means for transporting the said carcasses through said enclosure, said conveyor including a track and means suspending the said carcasses from said track for transport, said track within said enclosure being snaked back and forth along generally horizontal lines in parallel, closely spaced interconnected flights to constitute a plurality of compactly positioned elongated loops, to effect 180° rotation of said suspended carcasses during passes to each successive flight; and
    e. elongated line-flow fan means positioned within said enclosure and extending along a side thereof for establishing a recirculating curtain-like flow of the carbon dioxide refrigerant across the suspended carcasses within said enclosure, the said fan means being so positioned that the refrigerant flow stream therefrom extends substantially across the enclosure whereby the suspended carcasses transported throughout each loop receive uniform refrigeration alternately at opposite sides thereof.

2. Apparatus in accordance with claim 1, wherein the fan means comprise at least a pair of said line flow fans positioned within said enclosure parallel to each other and respectively positioned along the floor and ceiling of said enclosure.

3. Apparatus in accordance with claim 2, wherein said elongated fan means are positioned parallel to said flights, whereby the curtain flow therefrom is generally transverse to the direction of said flights.

4. Apparatus in accordance with claim 2, wherein said fan means are positioned transverse to said flights, whereby the curtain flow therefrom is generally parallel to direction of said flights.

5. Apparatus in accordance with claim 2, further including a vertical wall dividing said enclosure into two sub-chambers, the wall being spaced at opposite edges from respective sides of the enclosure for passage of the conveyor means between the sub-chambers, a pair of said fan means being positioned in each said sub-chamber at diagonally opposite interior edges thereof.

6. Apparatus in accordance with claim 1, wherein said track gradually changes in elevation along its progressive path through said enclosure, whereby said carcass is displaced vertically in addition to laterally and with respect to angular orientation as it is conveyed along successive of said flights.

7. Apparatus in accordance with claim 6 wherein said track is snaked back and forth in said enclosure at a plurality of levels, whereby to define a plurality of overlying tiers of said flights.

8. A method of chilling animal carcasses in an enclosed insulated chamber comprising injecting predetermined quantities of liquid carbon dioxide into the chamber to maintain a desired temperature therein, continuously conveying animal carcasses through the chamber by suspending said carcasses from the track of an endless conveyor arranged in parallel closely spaced interconnected flights constituting a plurality of compactly positioned elongated loops, each loop extending substantially across said chamber, whereby a substantial portion of the chamber contains cooling carcasses, and whereby the suspended carcasses are rotated 180° during passage to each successive flight; and directing at least one line-flow of refrigerated gas across said moving flights of carcasses from a location adjacent a corner of said chamber, whereby the line-flow of gas is caused to impinge alternately from flight to flight respectively on opposite sides of thr moving carcasses.

* * * * *